United States Patent [19]

Asadea et al.

[11] 3,870,596

[45] Mar. 11, 1975

[54] PROCESS FOR THE PREPARATION OF DISPERSION WATER FOR INCOMPLETELY REGENERATED CELLULOSE SUBSTANCE

[75] Inventors: Takashi Asadea; Shin Okamoto, both of Kyoto-fu, Japan

[73] Assignee: Tachikawa Research Institute, Kyoto, Japan

[22] Filed: June 22, 1971

[21] Appl. No.: 155,429

[52] U.S. Cl.......... 162/157 C, 162/146, 162/181 A, 264/188
[51] Int. Cl. .......................... D02g 3/00, G32b 7/00
[58] Field of Search............ 162/157 C, 181 A, 146; 264/195, 188

[56] References Cited
UNITED STATES PATENTS

| | | | |
|---|---|---|---|
| 2,893,821 | 7/1959 | Elling et al...................... | 264/195 X |
| 2,992,880 | 7/1961 | Toms................................. | 264/195 |
| 3,101,276 | 8/1963 | Hendricks.................... | 260/17.4 GC |
| 3,114,747 | 12/1963 | Campbell..................... | 162/157 C X |
| 3,320,117 | 5/1967 | Aoki et al. .................... | 162/157 C |
| 3,328,117 | 6/1967 | Emslie et al. ................... | 162/146 X |
| 3,344,016 | 9/1967 | Moggio et al..................... | 162/146 |
| 3,347,968 | 10/1967 | Thomas et al. .................... | 264/195 |
| 3,539,679 | 11/1970 | Kimuta et al. .................... | 264/195 X |

*Primary Examiner*—S. Leon Bashore
*Assistant Examiner*—Kenneth M. Schor

[57] ABSTRACT

The application discloses an improvement in the process of producing non-woven paper-like products from incompletely regenerated cellulose. The improvement resides in the paper making stage in which the cellulose product is dispersed in water and in particular in regulating the degree of hardness of the water according to the primary swelling value of the fibers. In further particular the degree is adjusted by the addition of salts such as magnesium, calcium, zinc and cadmium.

1 Claim, 2 Drawing Figures

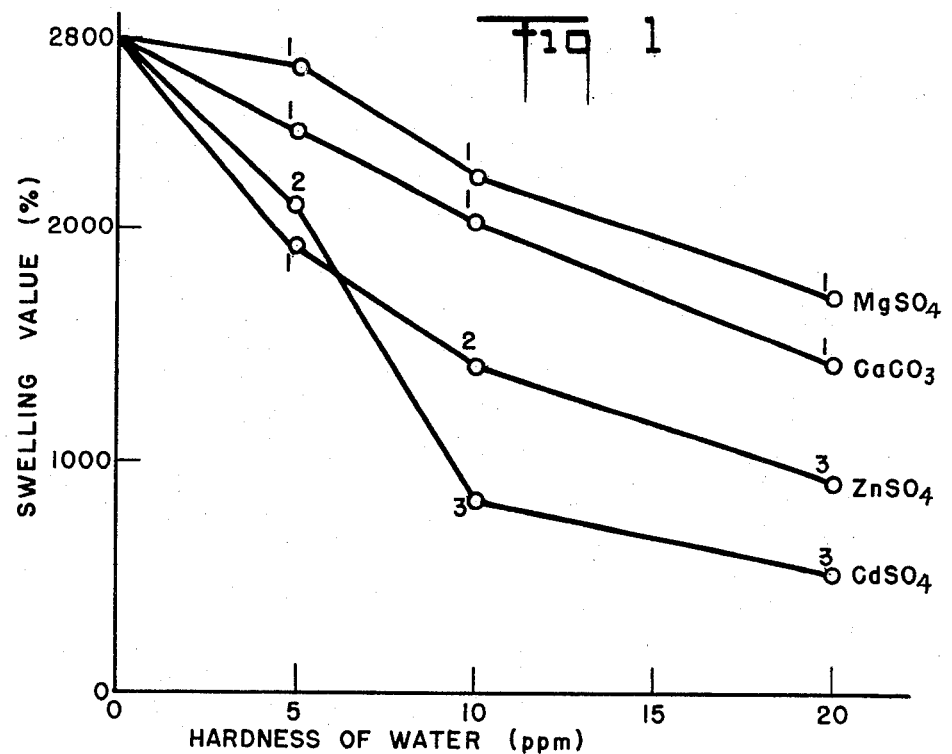
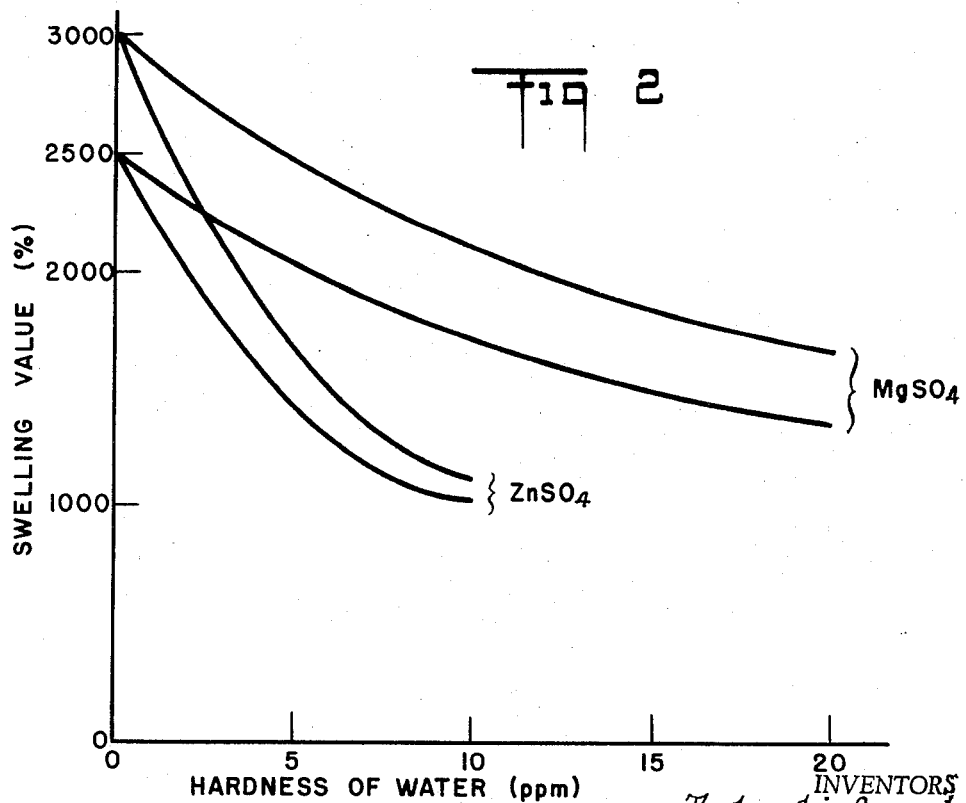

PROCESS FOR THE PREPARATION OF DISPERSION WATER FOR INCOMPLETELY REGENERATED CELLULOSE SUBSTANCE

This invention relates to a process wherein incompletely regenerated cellulose substance having a primary swelling value (PSV) of 250 to 10,000 are prepared in the spinning of a viscose having a high viscosity and high $\gamma$-value, the cellulose substance thus obtained being dispersed into water. According to the present invention the hardness of the dispersion water is adjusted to 0.5 – 100 ppm by adding one or combination of Mg, Ca, Zn or Cd salts to the water, the original hardness of which is 0 – 99 ppm, the paper or nonwoven fabric being manufactured by the wet process.

Following are the definitions of the words used in this specification.

Primary swelling value (PSV)

The primary swelling value is calculated by the following equation:

$$W/WD \times 100 \ (\%)$$

where W is the weight of cellulose substance centrifuged for 3 minutes by the force of 1,000 G after steeping in distilled water at 20°C for 5 minutes, and WD is the weight of bonedry substance.

Swelling value (SV)

The swelling value is calculated by the following equation:

$$W/WD \times 100 \ (\%)$$

where W is the weight of cellulose substance centrifuged for 3 minutes by the force of 1,000 G after steeping in the dispersing water of definite hardness (for example, 20 ppm) at 20°C for 5 minutes, and WD is the weight of bone-dry substance.

Water containing value (WV)

The water containing value is calculated by the following equation:

$$W/WD \times 100 \ (\%)$$

where W is the weight of a wet substance (ca. 5 grams as a wet sheet) and WD is the weight of bone-dry cellulose in the wet sheet.

Hardness of water and concentration of salt-solution

The unit used to measure the hardness of water is expressed by the concentration of 1 mg/l $CaCO_3$, and for other salts by their equivalent molecular concentration.

Processes to manufacture papers or non-woven products starting from incompletely regenerated cellulose substance having its PSV of 250 – 10,000 prepared by spinning viscose having a high viscosity and a high $\gamma$-value are described in e.g., U.S. Pat. Nos. 3,320,117 and 3,553,078. In these patents the relation of the PSV-value of the incompletely regenerated cellulose to the steps employed in the paper-making stage and the quality of the final product is explained. However, we have found that there are several factors other than PSV, which may affect the operation of these patented processes, e.g., the dispersion degree of the cellulose in the dispersion-water should basically correspond to the PSV-value of the cellulose, but practically the same PSV-value does not always show the same dispersion-degree, or despite the fact that the swelling value (SV) of the cellulose substance in the dispersion-water should be proportional to the PSV-value, this is not necessarily true. It was found that variations in the hardness of the original water employed in the dispersion of the cellulose is an important factor to be considered in order to insure that the dispersion degree of the cellulose according to the PSV can be anticipated and hence the desired swelling value obtained.

In other words, when incompletely regenerated cellulose substance is used in the paper making stage, we found that in order to keep the operation smooth and to get uniform products, it is necessary not only to regulate the PSV-value, but also to strictly maintain the value of hardness of the dispersion-water, and it has been found, in addition, that there is a suitable value of hardness of the dispersion-water which corresponds to the best condition for operation and to the quality of the final product which is desired.

FIG. 1 and FIG. 2 show the relation between the hardness of the water prepared by dissolving various kind of metallic salts into pure water and the SV of incompletely regenerated cellulose substances when putting them in the abovementioned water. In FIG. 1, the PSV of fibers is 2,800 percent, and in FIG. 2, they are 3,000 and 2,500 percent. The SV differs not only according to the hardness of water but also to the kind of salts. Moreover, as indicated by numerical value 1, 2 and 3 in FIG. 1, the degree of dispersion is influenced by the kind of metallic salts used (1 is very good dispersion, 2 is good dispersion and 3 is bad dispersion). For instance even though SV in 20 ppm solution of $CaCO_3$ and 10 ppm $ZnSO_4$ solution show the same value of 1,500, so far as the degree of dispersion is concerned, the former is far better.

Thus, in order to get the same water containing value (WV) of wet sheet at the couch-roller of the paper-sieving machine, it has been found that the concentrations of metallic salts in the dispersion-water varies decreasingly in the following order: Mg, Ca, Zn and Cd. Moreover, generally speaking as shown in FIG. 2, the higher the PSV-value is, the higher the hardness of the dispersion-water that can be used, and vice-versa. Therefore, there exists the best concentration of salts in the dispersion-water in order to get good dispersion of cellulose substance and smooth working under suitable selection of PSV according to the salt which is used. It seems that if the hardness of the dispersion-water goes over 100 ppm, some difficulty of working might occur.

The most favorable way to apply this invention is firstly to make the original water soft with ion-exchanger, and secondly to add to it a suitable quantity of one or a combination of Ca, Mg, Zn and Cd salts in order to get the desirable hardness. In such case, the hardness of original water is to be 0 – 99 ppm, and the quantity of salt added is so adjusted that the final hardness of the dispersion-water is from 0.5 to 100 ppm.

The wet sheet acquired by this invention is subjected successively to hot-acid-, desulfurization-, bleaching-treatment and finally it is dried, e.g., to treat with 15 gr/l $H_2SO_4$ in hot temperature, with 5 gr/l $Na_2S$ at 60°C, 1 gr NaClO bath at room temperature, etc. Example 1.

Ordinary town-water having its hardness of 30 ppm is treated by water-softener to the zero hardness, 20 ppm of $MgSO_4$ is added to this soft water, and we get the dispersion water with 20 ppm hardness. An incompletely regenerated cellulose substance is dispersed in the water, SV of cellulose substance in the dispersion-water was about 2,000. With this slurry, we produce a top-sheet for a baby diaper. In comparison with such a diaper as is produced by using ordinary town-water, this top-sheet for diaper is very uniform. Example 2.

Dispersion-water of 40 ppm hardness is prepared by adding 10 ppm $CaCl_2$ to ordinary town-water. Incompletely regenerated cellulose substance having PSV 2,700 are dispersed in this water wherein its SV is 1,500. Using this slurry, the disposable bed-sheet can be sieved smoothly on an ordinary paper-making machine facilitating the drawing off of the wet sheet from the sieving net and expediting the entire process as compared with using unmodified water only. Example 3.

Ordinary town-water having its hardness of 30 ppm is treated by a water softener to bring it substantially to zero hardness. A minute quantity of $MgSO_4$ is added to this soft water to obtain a dispersion water of 0.5 ppm hardness. An incompletely regenerated cellulose substance is dispersed in the water, the SV of the substance in the water being about 2,100. With this slurry a disposable bed-sheet is obtained. The sheet possesses a fabric drape and a fabric appearance because of its long fiber length.

We claim:

1. In a process, wherein paper or non-woven fabric is manufactured in the wet process by dispersing into dispersion water an incompletely regenerated cellulose substance having a PSV of 250 – 10,000 percent which is prepared in the spinning of a viscose having a high viscosity and a high gamma value, the steps of introducing a water softener in the dispersion water to bring it substantially to zero hardness and then adjusting the hardness of the water to 0.5 – 100 ppm by adding one or a combination of Mg, Ca, Zn and Cd inorganic salts to the water.

* * * * *